United States Patent
Jiang

(10) Patent No.: US 9,674,321 B2
(45) Date of Patent: Jun. 6, 2017

(54) MOBILE TERMINAL ANTENNA MODULE HOUSED WITHIN METAL REAR COVER SERVING AS A RADIATOR

(71) Applicant: Hua Jiang, Shenzhen (CN)

(72) Inventor: Hua Jiang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/062,056

(22) Filed: Mar. 5, 2016

(65) Prior Publication Data

US 2017/0034321 A1 Feb. 2, 2017

(30) Foreign Application Priority Data

Jul. 31, 2015 (CN) .......................... 2015 1 0464050

(51) Int. Cl.
*H04M 1/02* (2006.01)
*H01Q 1/24* (2006.01)

(52) U.S. Cl.
CPC .............. *H04M 1/026* (2013.01); *H01Q 1/24* (2013.01)

(58) Field of Classification Search
CPC .......... H01Q 1/44; H01Q 5/378; H01Q 5/385; H01Q 1/48; H01Q 1/24; H01Q 1/242; H01Q 1/243; H04M 1/0274; H04M 1/026; H04M 1/0202; H04M 1/0249; H04M 1/0254
See application file for complete search history.

(56) References Cited

U.S. PATENT DOCUMENTS

| | | | |
|---|---|---|---|
| 9,509,814 B1* | 11/2016 | Jiang | H04M 1/0274 |
| 2003/0058172 A1* | 3/2003 | Horibe | H01Q 1/243 343/702 |
| 2015/0123857 A1* | 5/2015 | Park | H01Q 1/243 343/702 |
| 2015/0138021 A1* | 5/2015 | Konu | H01Q 1/243 343/702 |
| 2015/0155614 A1* | 6/2015 | Youn | H04M 1/0249 343/702 |
| 2016/0049720 A1* | 2/2016 | Hwang | H01Q 1/243 343/702 |
| 2016/0064802 A1* | 3/2016 | Jiang | H01Q 1/243 343/702 |
| 2016/0118713 A1* | 4/2016 | Hong | H01Q 25/001 343/702 |
| 2016/0134321 A1* | 5/2016 | Yan | H04B 1/3888 455/575.1 |
| 2016/0182112 A1* | 6/2016 | Kim | H01Q 1/243 455/572 |
| 2016/0211572 A1* | 7/2016 | Liu | H01Q 9/42 |

* cited by examiner

*Primary Examiner* — Devan Sandiford
(74) *Attorney, Agent, or Firm* — Na Xu; IPro, PLLC

(57) ABSTRACT

A mobile terminal is disclosed. The mobile terminal includes an antenna module including a parasitic coupling piece and a dynamic switch; a housing having an accommodation space, the housing including a metal rear cover serving as a radiator of the antenna module, the radiator including a first metal part, a second metal part and a third metal part isolated from each other; and a main board received in the accommodation space and having a grounding point disposed on a surface thereof. The parasitic coupling piece is affixed on a surface of the second metal part facing to the main board, the parasitic coupling piece couples the second metal part and connects with the grounding point through the dynamic switch.

7 Claims, 2 Drawing Sheets

MOBILE TERMINAL ANTENNA MODULE HOUSED WITHIN METAL REAR COVER SERVING AS A RADIATOR

FIELD OF THE INVENTION

The present invention relates to mobile communication technology field.

DESCRIPTION OF RELATED ART

With the continuous development of cell phone, tablet computer etc mobile terminals, people have higher and higher demands on the signal performance of the terminal, calling effect and appearance of mobile communication. Due to the robustness and abrasion resistance characteristics of metallic, the mobile terminal with a full metal rear cover is loved by a broad consumer base.

The metal part of the metal rear cover and nonmetal part of the metal rear cover form a housing of the mobile terminal and it can not guarantee that the appearance of the housing has very high consistency and the overall appearance of the mobile terminal is influenced. Another one kind of improved mobile terminal is to migrate overally the antenna module to the rear cover of the metal and take the metal rear cover as the antenna radiator. But this kind of structure exists the deficiencies that antenna resonance and bandwidth are hard to adjust. But the rear cover of full metal will form the role of shielding the signal formed by the antenna module inside the mobile terminal. In order to avoid metal rear cover disturbing antenna signal, the mobile terminal of related technology will have nonmetal design on the part on the metal rear cover that is opposite to the antenna module.

Therefore, it is necessary to provide a new mobile terminal to overcome the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
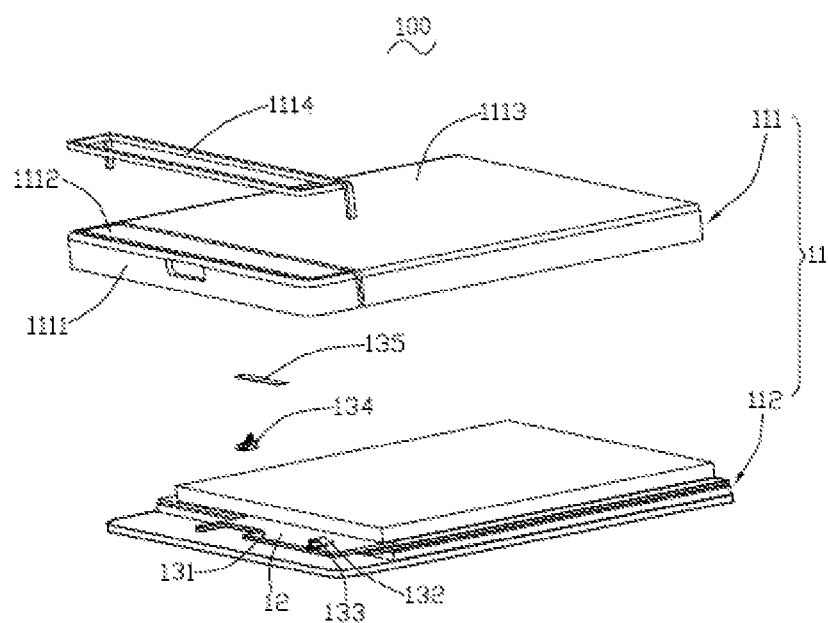
FIG. 1 is an isometric and exploded view of a mobile terminal in accordance with an exemplary embodiment of the present disclosure.
Figure 2:
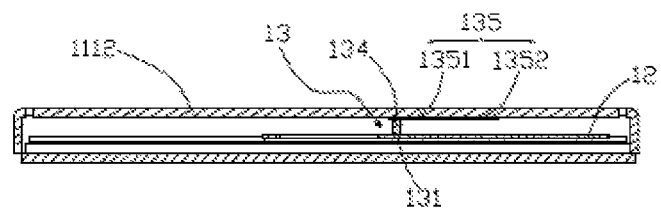
FIG. 2 is a cross-sectional view of the mobile terminal in FIG. 1.

Referring to FIGS. 1-2, a mobile terminal 100 in accordance with an exemplary embodiment of the present disclosure includes a housing 11, a main board 12 and an antenna module 13. The housing 11 has an accommodation space. The antenna module 13 is set on a surface of the main board 12. The main board 12 and the antenna module 13 are received in the accommodation space of the housing 11.

The housing 11 includes a metal rear cover 111 and a display 112. The metal rear cover 111 and the display 113 assembles and forms the accommodation space.

The metal rear cover 111 includes a first metal part 1111, a second metal part 1112, a third metal part 1113 and an insulating tape 1114. The insulating tape 1114 is set in a gap among the first metal part 1111, the second metal part 1112 and the third metal part 1113.

The first metal part 1111 is a metal head cover located on the top of the mobile terminal 100. The third metal part 1113 is a metal middle cover of covering the back of the mobile terminal 100. The second metal part 1112 is set between the first metal part 1111 and the third metal part 1113, and the second metal part 1112 cooperates with the entirety of the third metal part 1113 to cover the back of the mobile terminal 100. Wherein, the entirety of the second metal part 1112 shows rectangular plate-type structure. In the embodiment, the length of the second metal part 1112 is 83.5 mm and the width is 10.8 mm.

The insulating tape 1114 is made from insulated rubber material which is used among the first metal part 1111, the second metal part 1112 and the third metal part 1113. In the embodiment, the width of the insulating tape 1114 is 1.5 mm.

In the disclosure, the first metal part 1111 and the second metal part 1112 serve as the radiators of the antenna module 13. They are used for receiving and sending electromagnetic radiation The main board 12 is used for carrying the antenna module 13 and other functional devices of the mobile terminal 100 such as microphone and loudspeaker etc.

The antenna module 13 is an LTE antenna module in the embodiment of the disclosure. Wherein the frequency band of the LTE antenna module is 824 MHz-960 MHz or 1710 MHz-2690 MHz. Of course, among other replaceable embodiments, the antenna module can be the antenna module of other kinds such as diversity antenna module, WIFI antenna module etc.

The antenna module 13 includes the radiator, a data processing module (not shown on figure) set on the main board 12, a grounding point 131, a feed point 132, a connecting piece 133, a dynamic switch 134 and a parasitic coupling piece 135.

Specifically, in the disclosure, the radiator is the first metal part 1111 and the second metal part 1112.

The data processing module, the grounding point 131, the feed point 132 and the dynamic switch 134 are set on the surface of the main board 12. Wherein the data processing module connects with the grounding point 131 electronically. The grounding point 131 connects with the dynamic switch 134. Another end of the dynamic switch 134 connects with the parasitic coupling piece 135 affixed on the inner surface of the second metal part 1112. The parasitic coupling piece 135 couples with the second metal part 1112. The second metal part 1112 couples with the feed point 132, and the feed point 132 connects with the data processing module electronically to form loop.

Similarly, the connecting piece 133 is set on the surface of the main board 12 and connects with the first metal part 1111 electronically. The first metal part 1111 is set and couples the dynamic switch 134. The dynamic switch 134 connects with the grounding point 131 electronically. The grounding point connects the data processing module electronically. The data processing module connects with the connecting piece 133 to form another loop. In the embodiment, the connecting piece 133 is metal shrapnel.

The dynamic switch 134 can be a capacitance, an inductance or a tunable device. Two ends of the dynamic switch 134 connects with the grounding point 131 located on the main board 12 respectively and the parasitic coupling piece 135 to control working state of the parasitic coupling piece 135.

The parasitic coupling piece 135 includes a substrate 1351 and a metal coupling piece 1352. The metal coupling piece 1352 is affixed on the substrate 1351 and the substrate 1351 is affixed on the surface of the second metal part 1112. Preferably, the substrate 1351 is flexible printed circuit board. The thickness is 0.2 mm-1 mm. Wherein, the metal coupling piece 1352 and the second metal part 1112 forms capacitor through setting the substrate 1351. The parasitic coupling pieces 135 changes the resonance of main antenna through parasitic coupling.

When sending signal, the dynamic switch 134 adjusts the resonance of the antenna module 13 through controlling the working state of the parasitic coupling piece 135 to make the antenna module 13 to keep very high efficiency within 824 MHz-960 MHz and 1710 MHz-2690 MHz two frequency bands.

Figure 3:
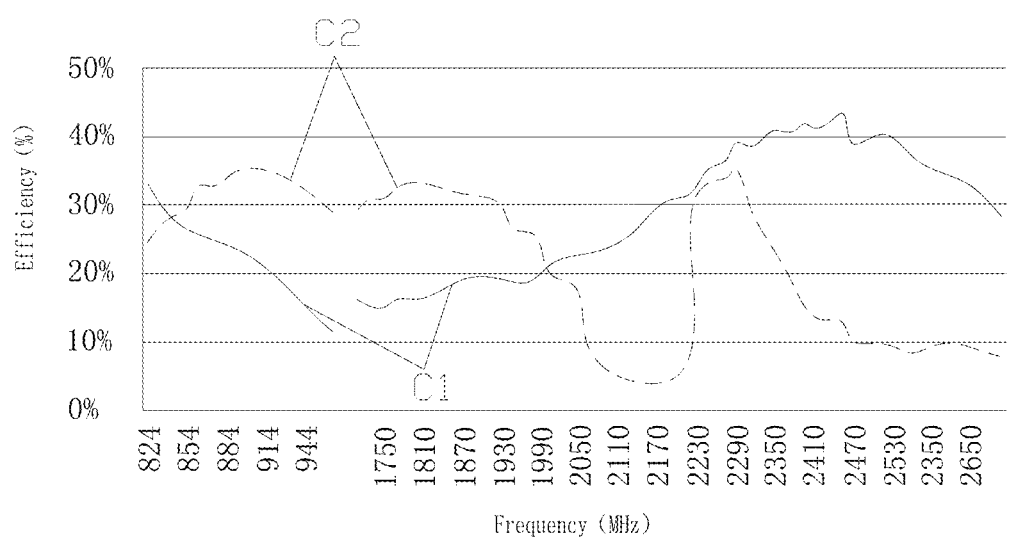
FIG. 3 is efficiency diagrams of an antenna module in the mobile terminal working at different frequencies when a dynamic switch thereof is at connected or disconnected state.

Please refer to FIG. 3. When the antenna module 13 is at state one, the dynamic switch 134 is at disconnected state. The parasitic coupling piece 135 does not couple. Please refer to solid line C1 of FIG. 3, at this time, the radiator has very high efficiency when the frequency is larger than 1990 MHz, but the efficiency of the antenna module within these frequency regions shows the declined trends rapidly. This will cause that the efficiency of the antenna module 13 within this frequency region cannot meet the demands of user.

When the antenna module is at state II, the dynamic switch 134 is at connected state and the parasitic coupling piece 135 couples and adjusts the resonance of the radiator. Please refer to dashed line C2 in FIG. 3, at this time, the efficiency of the antenna module 13 within 824 MHz-960 MHz frequency band can be changed greatly. Please refer to FIG. 3, when the dynamic switch is at connected state, the radiator has very high efficiency within 824 MHz-960 MHz frequency band. When it is at 1710 MHz-2690 MHz frequency band, the fluctuation of the efficiency of the antenna module 13 is very large. When it is within 1710 MHz-1930 MHz frequency band, the efficiency of the antenna module 13 is over 30%, but when the frequency is larger than 1930 MHz, the efficiency of the antenna module 13 is lowered sharply. Although the very narrow frequency of said antenna module 13 around 2290 MHz is increased slightly. Generally within 1710 MHz-2690 MHz frequency region, the efficiency of the radiator is not stable and cannot meet the demands of user. When the dynamic switch 134 is started, the parasitic coupling sheet 135 can couple the radiator; at this time the antenna module has very high resonance and efficiency within 1710 MHz-2690 MHz frequency band to meet the demands of user.

In the disclosure, coupling the antenna module of the mobile terminal through the parasitic coupling sheet can improve the bandwidth of the antenna module and the efficiency of the antenna module under different frequency. The dynamic switch can control parasitic coupling sheet and choose different inductance and capacitance to couple the resonance of the antenna module of the mobile terminal to make the antenna module to have very high efficiency under different frequency bands.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile terminal, comprising:
an antenna module including a parasitic coupling piece and a dynamic switch;
a housing having an accommodation space, the housing including a metal rear cover serving as a radiator of the antenna module, the radiator including a first metal part, a second metal part and a third metal part isolated from each other;
a main board received in the accommodation space and having a grounding point disposed on a surface thereof; wherein
the parasitic coupling piece is affixed on a surface of the second metal part facing to the main board, the parasitic coupling piece couples the second metal part and connects with the grounding point through the dynamic switch.

2. The mobile terminal as described in claim 1, wherein the metal rear cover further includes an insulating tape disposed on a junction of the first metal part, the second metal part and the third metal part.

3. The mobile terminal as described in claim 1, wherein the parasitic coupling piece includes a substrate affixed on the surface of the second metal part facing to the main board and a metal coupling piece affixed on the surface of the substrate facing to the main board and connects with the dynamic switch.

4. The mobile terminal as described in claim 1, wherein the dynamic switch is a capacitive switch or an inductance switch.

5. The mobile terminal as described in claim 1 further including a feed point disposed on the main board and coupling the second metal part.

6. The mobile terminal as described in claim 1, wherein the antenna module further includes a connecting piece arranged on the main board and connecting with the first metal part electrically.

7. The mobile terminal as described in claim 1, wherein the antenna module is an LTE antenna module.

* * * * *